United States Patent [19]

Slonim

[11] Patent Number: 4,619,582
[45] Date of Patent: Oct. 28, 1986

[54] APPARATUS FOR RECOVERING THE ENERGY OF A MOVING FLUID

[76] Inventor: David M. Slonim, P.O. Box 1869, 3, Ourani Str., Nicosia, Cyprus

[21] Appl. No.: 790,961

[22] Filed: Oct. 22, 1985

[51] Int. Cl.[4] ............................................. F03D 5/02
[52] U.S. Cl. ......................................... 416/8; 415/5; 416/119; 416/197 A; 416/11
[58] Field of Search ........................................ 416/7-8, 416/197 A, 119, DIG. 6, 11; 415/5

[56] References Cited

U.S. PATENT DOCUMENTS

| 3,804 | 10/1844 | Robinson | 416/119 |
|---|---|---|---|
| 763,623 | 6/1904 | Nance | 416/8 |
| 764,571 | 7/1904 | Fisher | 416/11 |
| 1,074,059 | 9/1913 | McWolfe | 416/8 |
| 1,266,472 | 5/1918 | Howe | 416/8 X |
| 1,451,298 | 4/1923 | Greth | 416/8 |
| 1,502,296 | 7/1924 | Doak | 416/7 |
| 1,707,795 | 4/1929 | Brown | 416/8 |
| 4,209,281 | 7/1980 | Edmunds | 416/197 A |
| 4,536,125 | 8/1985 | Herman et al. | 416/7 X |

FOREIGN PATENT DOCUMENTS

| 70995 | 4/1950 | Denmark | 416/197 A |
|---|---|---|---|
| 2406331 | 8/1975 | Fed. Rep. of Germany . | |
| 3035247 | 3/1982 | Fed. Rep. of Germany | 416/197 A |
| 524142 | 8/1921 | France | 416/197 A |
| 55-128671 | 4/1980 | Japan . | |
| 79708 | 6/1918 | Switzerland | 416/7 |
| 84132 | 7/1920 | Switzerland | 416/197 A |

Primary Examiner—Everette A. Powell, Jr.
Attorney, Agent, or Firm—Young & Thompson

[57] ABSTRACT

Apparatus for recovering energy from a moving fluid, comprising a frame that rolls on a circular track about a vertical upright that is secured to the ground. Vanes on the frame respond to fluid pressure to orient the frame in an upstream-downstream or upwind-downwind direction. The frame carries spaced pairs of sprocket wheels about which endless sprocket chains are trained, with flaps pivotally connected between the sprocket chains. Along the lower run of the chains, the flaps hang down and the fluid presses against them to circulate the chains. The kinetic energy of rotation of the sprocket wheels is converted to another form of energy, for example electrical energy by a generator carried by the frame. The flaps comprise pivotally interconnected frames so that they ride about the sprockets and lie flat on the upper run. Each frame contains a plurality of louver slats that let the fluid through to downstream or downwind flaps and also direct the fluid toward the center of the downstream or downwind flaps, so that the impetus of the fluid is shared among a plurality of flaps that depend from the lower run.

7 Claims, 4 Drawing Figures

APPARATUS FOR RECOVERING THE ENERGY OF A MOVING FLUID

The present invention relates to an apparatus for recovering the energy of a moving fluid, e.g. water or wind.

It is an object of the present invention to provide an apparatus for recovering energy from a moving fluid, which will automatically orient itself to an optimum position of use.

It is another object of the present invention to provide an apparatus for recovering energy from a moving fluid, which will present a desirably large area broadside to the fluid.

Still another object of the present invention is the provision of such an apparatus, which achieves maximum energy recovery per unit area acted on by the fluid.

Finally, it is an object of the present invention to provide such an apparatus, which will be relatively simple and inexpensive to manufacture and install, easy to maintain, and rugged and durable in use.

Other objects of the present invention will become apparent from a consideration of the following description, taken in connection with the accompanying drawings, in which.

Figure 1:
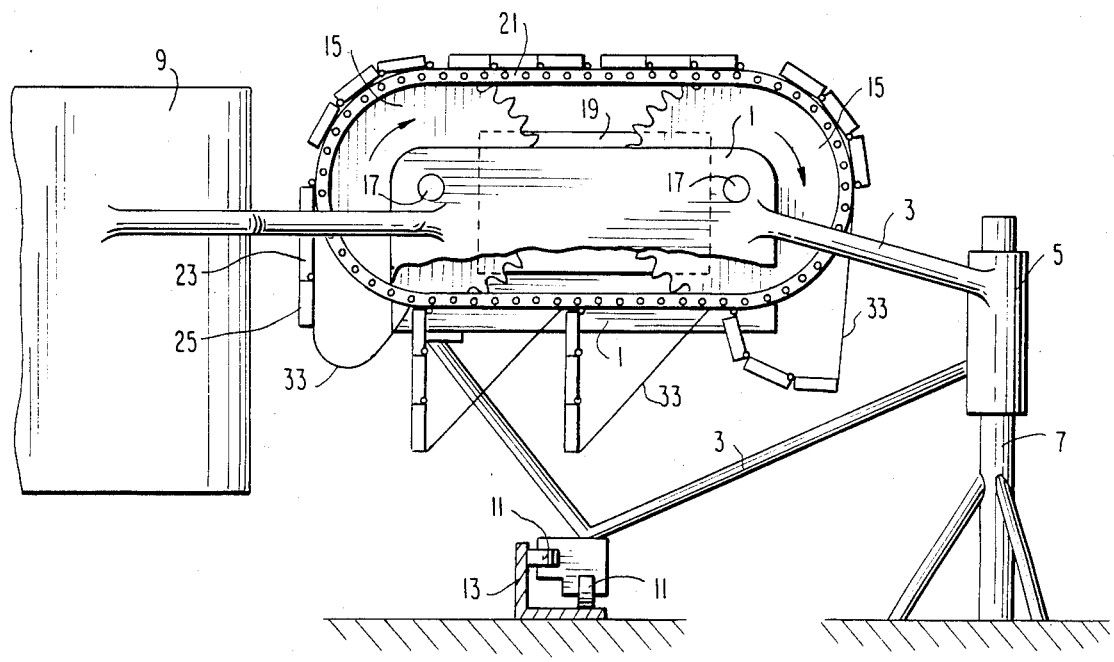
FIG. 1 is a somewhat schematic side elevational view, with parts broken away, of apparatus for moving fluid energy recovery according to the present invention.

Referring now to the drawings in greater detail, there is shown apparatus according to the present invention, comprising a frame 1 in the form of a pair of vertical plates interconnected intermediate their length.

Arms 3 connect frame 1 rigidly with a vertical cylindrical sleeve 5 that is supported for rotation on an upright 7 fixedly secured to the ground.

Figure 2:
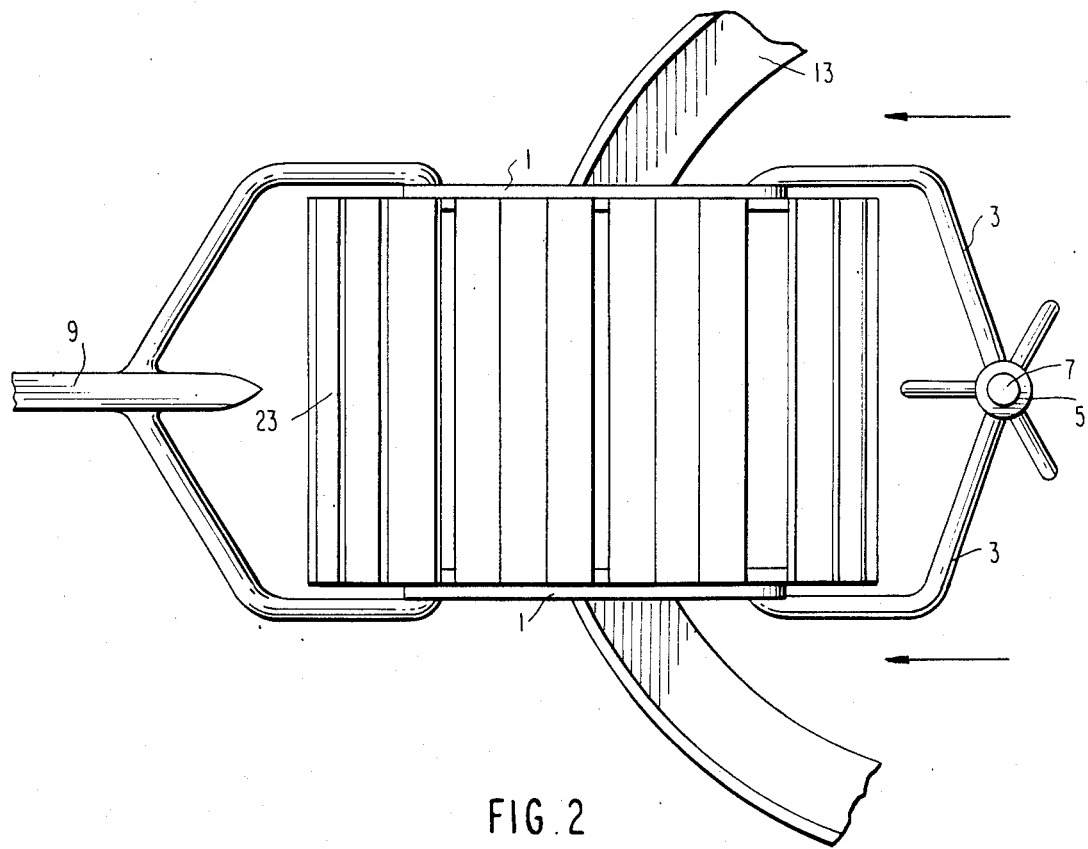
FIG. 2 is a top plan view of FIG. 1.

Fixedly secured to frame 1 is a central vertical vane 9, which extends rearwardly of the device as far as needed. Vane 9 improves the tendency of the device of the present invention to swing about upright 7 until the vane 9 is pointing into the flowing fluid, whose direction is illustrated by the arrows in FIG. 2.

This horizontal swinging movement of frame 1 is made possible by rollers 11 some of which rotate about vertical axes and bear against the upright flange of an arcuate track 13 and the others of which rotate about horizontal axes that extend radially of upright 7, these latter rollers being supported by the horizontal flange of track 13. Track 13 is coaxial with upright 7. Rollers 11 are mounted on the underside of frame 1.

Mounted for rotation on frame 1 are four sprocket wheels 15 disposed pairwise in two parallel vertical planes and supported for rotation on shafts 17 which in turn are journalled in frame 1. An electrical generator 19 is also carried by frame 1 and is disposed between the pairs of sprocket wheels 15. Means (not shown) is provided for converting the rotation of shafts 17, which are rigid with sprocket wheels 15, into rotation of a rotor (not shown) of generator 19 relative to a stator (not shown) in the same generator, thereby to generate electricity, which is transmitted from the device of the present invention by suitable electrical connections (not shown). Alternatively, the rotation of shafts 17 or either of them can be used to store energy as by the direct mechanical connection of shafts 17 to means (not shown) for increasing the elevation of a solid or a liquid or the pressure of a gas.

An endless sprocket chain 21 extends over each coplanar pair of sprocket wheels 15, there thus being two sprocket chains 21 disposed in vertical parallel planes. The chains are in the nature of roller chains with rollers (not shown) disposed on their pintles, these rollers riding on horizontal stationary supports (not shown) carried by frame 1, which support the upper and lower runs of chains 21 between wheels 15 in a conventional manner.

Figure 3:
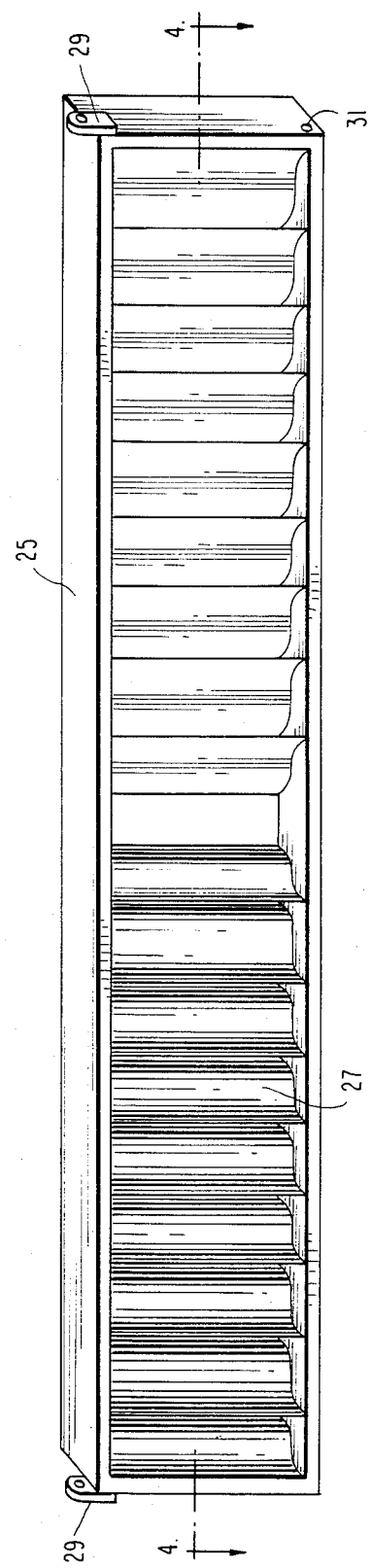
FIG. 3 is an enlarged detail view of an individual unit of a flap according to the present invention.
Figure 4:
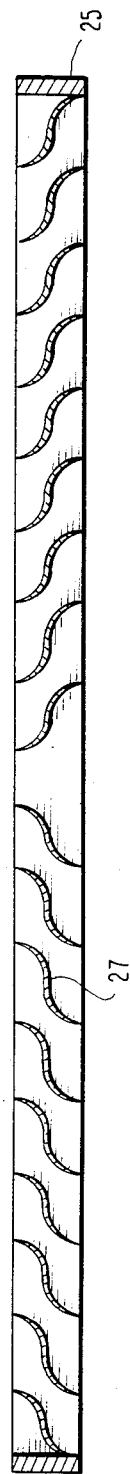
FIG. 4 is a section taken on the line 4—4 of FIG. 3.

Pivotally suspended between the chains 21 are flaps 23 each of which is composed of a plurality (three in the illustrated embodiment) of pivotally interconnected elongated rectangular frame 25 in which are mounted plural louver slats 28 as best shown in FIGS. 3 and 4. Frames 25 are pivotally interconnected with each other by a plurality of brackets 29 that receive pivot pins (not shown) that fit in holes 31 of the next adjacent frame 25. The brackets 29 adjacent the chains are pivotally interconnected, not with another frame 25 but rather with the chains 21. Notice that the pivotal axes of the frames are disposed at the forward side of the frames with respect to the direction of the fluid, that is, the pivotal axes are on the upstream or upwind side of the flaps.

There is thus provided an endless series of flaps circulating on the frame along an endless path having upper and lower runs.

The lower end of the outermost frame 25 is secured to chains 21 by means of cables 33, so that the flaps cannot simply blow backward in the fluid current.

It might at first appear that the upstream or upwind flap 23 would mask all of the flaps downstream or downwind of it. But this does not in fact happen, thanks to the louver slats 27, which, as best seen in FIG. 4, not only permit the fluid to pass between the slats but also direct the fluid centrally of each flap, so that loss of the fluid from the extreme horizontal edges of the flaps is reduced to a minimum.

At the same time, thanks to the arrangement of the louver slats 27, each flap 23 will receive a substantial impetus from the fluid, the kinetic energy of the fluid being largely dissipated by the time the fluid emerges from the flap farthest downstream or downwind. In the process, however, the impetus of the fluid will be distributed among the various flaps that depend below the sprocket wheels 15, so that all the downwardly depending flaps will assist in turning the sprocket wheels in the direction of the arrows in FIG. 1, with consequent production of electrical energy or mechanical storage of potential energy as described above.

The pivotal interconnection of the individual frames 25 comprising each flap 23, has a number of advantages. One is that the flaps automatically assume a concave configuration facing the fluid. Another is that the flaps pass about the sprockts 15 without interference either with the sprockets or with the flaps. Specifically, along the upper run of the endless chains 21, the flaps will lie flat thanks to gravity and to the pressure of the wind or water; but when passing about the sprocket wheels 15, the flaps will approximate the curvature of the chain about the sprocket wheels, because the individual flap components are pivotally interconnected.

If the device is submerged in a flowing stream of water, then means (not shown) can be provided for varying the buoyancy of the device.

Although the present invention has been described and illustrated in connection with preferred embodiments, it is to be understood that various modifications and variations may be resorted to, without departing from the purview and scope of the present invention as defined by the appended claims.

What is claimed is:

1. Apparatus for recovering energy from a moving fluid comprising a frame, means mounting the frame for horizontal swinging movement about a fixed vertical axis under the influence of the fluid, an endless series of flaps, means mounting said endless series of flaps for circulating movement on the frame in an endless path having horizontal upper and lower runs, means mounting said flaps for vertical swinging movement whereby said flaps depend from said lower run and lie flat along said upper run, a plurality of said flaps depending from said lower run being disposed in spaced parallel vertical planes, said flaps each comprising a plurality of horizontally elongated rigid frames pivotally interconnected about horizontal axes, louver slats disposed within each said rigid frame and extending transverse to the length of the rigid frame for permitting fluid to pass through the rigid frame while at the same time exerting pressure against the louver slats, there being a plurality of said louver slats on each side of the longitudinal center of each said horizontally elongated rigid frame, all the slats on one side of said center being inclined in one direction and all the slats on the other side of said center being inclined in an opposite direction to urge the fluid that passes through the slats toward a central portion of the next flap in a downstream or downwind direction, and means for converting the kinetic energy of said moving flaps into another form of energy.

2. Apparatus as claimed in claim 1, said frames being pivotally interconnected about axes disposed on the upstream or upwind side of the flaps when the flaps depend from said lower run.

3. Apparatus as claimed in claim 1, said flaps being interconnected by endless sprocket chains that pass about sprocket wheels.

4. Apparatus as claimed in claim 1, said vertical axis being spaced a subtantial distance upstream or upwind of said frame.

5. Apparatus as claimed in claim 4, and a fixed upright secured to the ground and about which said frame swings and which is coaxial with said fixed axis.

6. Apparatus as claimed in claim 1, in which said means mounting said frame for horizontal swinging movement comprise wheels supporting said frame, and a circular track coaxial with said vertical axis on which said wheels roll.

7. Apparatus as claimed in claim 1, and a vertical vane carried by the frame and adapted to be acted on by the fluid for orienting the frame in a direction such that said flaps depending from said lower run confront the fluid broadside.

* * * * *